June 5, 1951

A. G. EDWARDS 2,555,582

COMBINATION WOODWORKING POWER TOOL

Filed May 8, 1946

INVENTOR
ARCHIBALD GEORGE EDWARDS

ATTORNEY

INVENTOR
ARCHIBALD GEORGE EDWARDS

ATTORNEY

June 5, 1951          A. G. EDWARDS          2,555,582

COMBINATION WOODWORKING POWER TOOL

Filed May 8, 1946          3 Sheets-Sheet 3

INVENTOR
ARCHIBALD GEORGE EDWARDS

Ernest E. Carver
ATTORNEY

Patented June 5, 1951

2,555,582

UNITED STATES PATENT OFFICE 2,555,582

COMBINATION WOODWORKING POWER TOOL

Archibald George Edwards, South Westminster, British Columbia, Canada

Application May 8, 1946, Serial No. 668,217

1 Claim. (Cl. 144—35)

My invention relates to improvements in power tools. The objects of the invention are to provide in a single compact unit, a drill press, a lathe, a circular saw, a vertical saw and other associated tools, all of which are driven from one prime mover through a single operating belt and pulley train, and to provide for the simple interconnection of components of the various tools with the driving train, without having to remove one part for the substitution of another, except in such cases as removing a face plate to fit a drill chuck or to remove a circular saw to fit a grinding wheel or vice versa. Further objects will appear as the specification proceeds.

Referring to the drawings.

In the drawings like characters of reference indicate corresponding parts in each figure.

Figure 6:
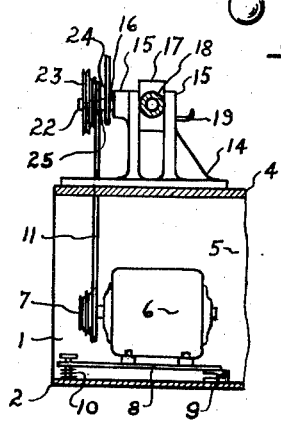
Fig. 6 is a detail view taken on the line 6—6 of Figure 4.

The numeral 1 indicates generally a cabinet base having a bottom wall 2, see Figure 6, a front wall 3 and a top wall or table 4. A compartment 5 is provided below the table 4 to house a motor 6. The motor 6 is fitted with a stepped pulley 7 and is mounted upon a base plate 8 which is hinged at its inner end as at 9. The front end of the base plate may be partially supported by a spring 10 to take a portion of the weight of the motor off the main belt 11 fitted to the pulley 7.

Mounted upon the table 4 above the motor 6 is a bed plate 14 having a set of bearings 15 between which a sleeve 16 is rockingly mounted, and on the sleeve is a hub 17 which supports a radially mounted column 18 which is adapted to be held in vertical or horizontal position by a pin 19 extending through one of the bearings into an appropriate aperture in the hub. Aligned with the sleeve is a shaft 22 upon which a stepped pulley 23 and a single pulley 24 secured to a sleeve 25 are rotatably mounted. Secured to the column 18 is a spindle mounting 28 having a base arm 29 (Fig. 3) with a bearing 31 at its free end and a standard 32 intermediate its length, which terminates in a pair of spaced bearings 34, in which a drill shaft 35 is journalled. Swingingly mounted at the head of the column 18 is an arm 37 which carries a pair of spaced pulleys 38 and is adjusted as to position by a bolt 39 to tighten a belt 40 connecting the single pulley 24 with a pulley 41 which is slidably but non-rotatably mounted upon the drill spindle 35 between the bearings 34. The drill spindle extends through a sleeve 42 and is held against endwise movement thereon by collars 43. The sleeve 42 is journalled at its lower end in the bearing 31 and is moved in a downward direction by a forked lever 45 which is fulcrumed upon the standard 32 in the usual way. The drill spindle 35 is fitted at its upper end with a half coupling 47 having a pair of upstanding pins 48 and is appropriately threaded at its lower end to receive a drill chuck 49 or any other piece of equipment required. A thumb screw 50 extends through the bearing 31 to engage the sleeve 42 and hold it against endwise movement.

Figure 4:
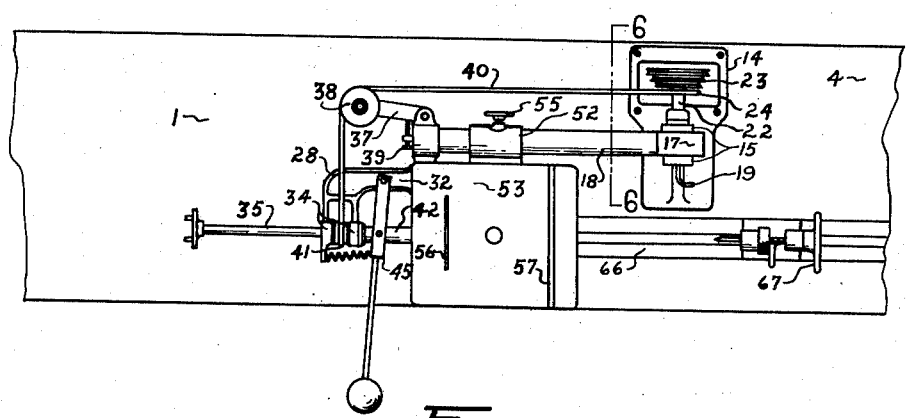
Fig. 4 is a plan view showing the machine arranged as a circular saw.
Figure 5:
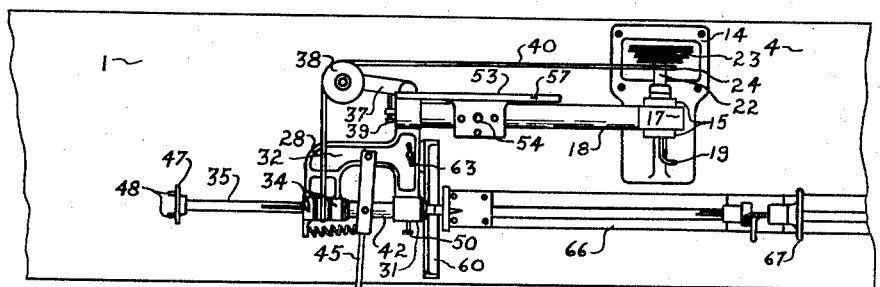
Fig. 5 is a plan view showing the machine arranged as a lathe.

Slidably mounted upon the column 18 is a sleeve 52 supporting a table 53, which table is pivotally mounted upon a pin 54 extending from the sleeve and which may be adjusted to any desired angle by either rocking the table about its pin, or rocking the sleeve about the column, or both. The sleeve is adapted to be locked in any position upon the column 18 by a set screw 55 (Fig. 4) and the table 53 is slotted as at 56 to bridge the cutting edge of a circular saw, not shown, and is grooved as at 57 to receive the slide of a fence or gauge, not shown. The table is provided to the left of the bed plate 14 with a semi-circular guard 60 (Figs. 1 and 5) having adjacent its rear upper edge a lug 61 upon which the spindle mounting 28 is adapted to rest when the column 18 is laid over to the left for use of the machine as a horizontal spindle tool and when so placed, a thumb screw 63, see Figures 3 and 5, is used to secure the spindle mounting 28 and the associated parts in fixed position.

Figure 3:
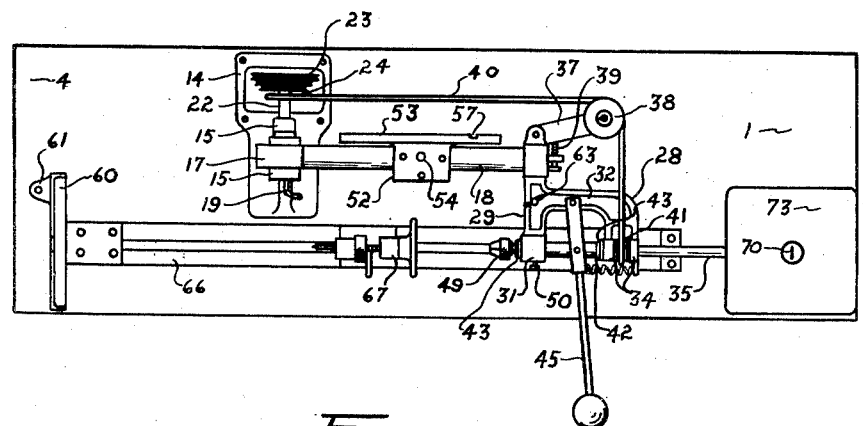
Fig. 3 is a plan view showing the machine arranged as a vertical saw.
Figure 7:
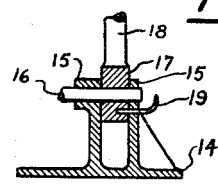
Fig. 7 is a detail view of the drill column mounting.

Mounted above the table 4 is a lathe bed 66 which is appropriately fitted with a tail stock 67 and behind the bed a standard 69 is provided to support the spindle mounting 28 in horizontal position when the column is lowered to the right as viewed in Figure 3. A vertical saw 70 is mounted upon the table 4 to the right of the lathe bed 66, which saw machine consists of a housing 72, see Figure 1, supporting a tilting table 73 and having a spindle, not shown, which is fitted with a half coupling 75. Obviously the lathe bed will be provided with a suitable tool rest, not shown.

Figure 1:
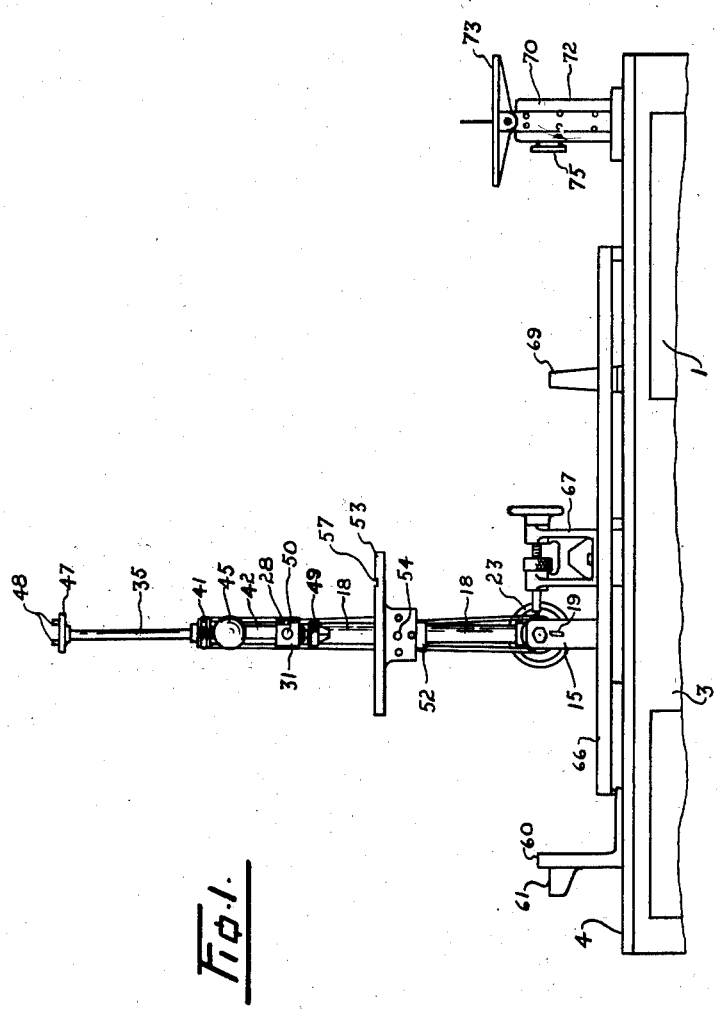
Fig. 1 is a front elevational view of the invention.
Figure 2:
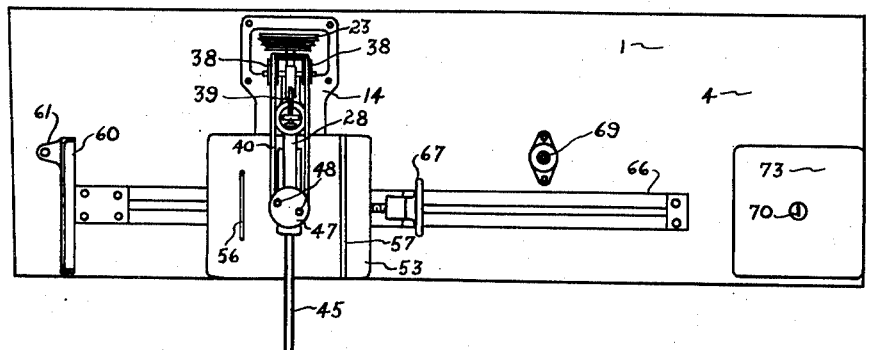
Fig. 2 is a plan view showing the machine arranged as a drill press.

When using the machine as a drill press, the drill column 18 is set in vertical position as shown in Figure 1, the column being held erect by insertion of the pin in the appropriate aperture in the hub 17. The table 53 is set to horizontal position as shown and set to the desired height by sliding the sleeve 52 upon the column and securing it by means of the locking screw 55. The drill spindle is fitted with the drill chuck 49, thus completing the setting of the tool.

To change over to use the vertical saw 70, the column 18 is swung to the right and the drill spindle 35 moved to the left by manipulating the lever 45, so as to allow the half coupling 47 to pass the edge of the vertical saw table without the need for tilting said table, then the spindle is allowed to return to its normal position, when the half couplings 47 and 75 will engage. To prevent accidental disengagement of the coupling parts, the thumb screw 50 is tightened, thus locking the sleeve 42 against endwise movement and leaving the vertical saw 70 ready for use. It will be obvious that while the saw 70 is shown as a sabre tooth saw, that a jig saw with frame may be substituted.

When the device is to be used as a lathe, the column 18 is swung to the left and to a horizontal position, the column being secured by connecting the spindle mounting 28 to the lug 61. The drill chuck 49 is removed and a face plate or other required tool is fitted upon the spindle and the table 53 upon the column 18 is swung out of the way of any work to be carried between the lathe centres.

If the machine is to be used as a circular saw, the lathe chuck or face plate is removed and a circular saw, not shown, is mounted upon the drill spindle in its place, said saw being partially housed in the semi-circular guard. The table 53 is moved along the column 18 until the slot 56 is aligned with the circular saw, when it is lowered into horizontal position and is laid over said saw, the saw being allowed to project through the slot in the usual way.

In each of the above positions, the sleeve 42 of the drill spindle is held against endwise movement by the set screw 50.

What I claim as my invention is:

A combination power tool comprising a table, a bearing upon the table, a drive shaft journalled in the bearing, a drill column mounted to swing about the axis of the bearing, a drill spindle carried by the drill column, drive means between the drive shaft and the drill spindle, a lever for imparting endwise movement to the drill spindle, a saw machine mounted upon the table, said machine having a horizontal shaft, said drill spindle and said saw machine shaft each having a complementary connecting member, said drill spindle being adapted to be brought into alignment with the shaft of the saw machine, said lever being adapted to move the drill spindle when so aligned to couple the drill spindle and the saw machine shaft in operative engagement.

ARCHIBALD GEORGE EDWARDS.

REFERENCES CITED

The following references are of record in the file of this patent:

UNITED STATES PATENTS

| Number | Name | Date |
| --- | --- | --- |
| 169,998 | Kimball | Nov. 16, 1875 |
| 207,150 | Almond | Aug. 20, 1878 |
| 361,261 | Caler | Apr. 19, 1887 |
| 598,362 | Connelly | Feb. 1, 1898 |
| 699,535 | Kelley | May 6, 1902 |
| 801,705 | Bauser | Oct. 10, 1905 |
| 1,524,224 | Werner | Jan. 27, 1925 |
| 1,942,834 | Railley | Jan. 9, 1934 |
| 2,016,528 | Wilson | Oct. 8, 1935 |
| 2,200,799 | Miller | May 14, 1940 |
| 2,259,899 | Long | Oct. 21, 1941 |
| 2,364,396 | Stahler | Dec. 5, 1944 |

FOREIGN PATENTS

| Number | Country | Date |
| --- | --- | --- |
| 91,043 | Switzerland | Oct. 1, 1921 |
| 282,130 | Italy | Feb. 2, 1931 |